United States Patent

Valyi

[15] 3,670,066
[45] June 13, 1972

[54] METHOD OF COMPRESSION MOLDING A THERMOPLASTIC ARTICLE WITH WALLS OF VARIABLE THICKNESS

[72] Inventor: Emery I. Valyi, 52 Sycamore Avenue, Riverdale, N.Y. 10471

[22] Filed: Nov. 10, 1969

[21] Appl. No.: 875,303

Related U.S. Application Data

[60] Division of Ser. No. 834,233, June 12, 1969, abandoned, which is a continuation of Ser. No. 618,862, Feb. 27, 1967, abandoned.

[52] U.S. Cl............................264/148, 18/30 CR, 18/30 WR, 18/42 J, 18/42 RR, 264/40, 264/325, 264/328
[51] Int. Cl......................B29c 3/00, B29c 17/14, B29f 1/00
[58] Field of Search ..........................264/323, 325, 328, 148; 18/42 J, 42 RR, 30 WR, 30 CR, DIG. 18

[56] References Cited

UNITED STATES PATENTS

| | | | |
|---|---|---|---|
| 2,981,976 | 5/1961 | Maier | 18/42 J UX |
| 2,516,065 | 7/1950 | McElligott | 264/325 X |
| 2,355,613 | 8/1944 | Wacker | 18/42 J |
| 2,781,547 | 2/1957 | Moxness | 18/42 J |

Primary Examiner—Robert F. White
Assistant Examiner—J. H. Silbaugh
Attorney—Nathaniel L. Leek

[57] ABSTRACT

A method for molding articles having variable thickness walls from thermoplastic material. An amount of plastic slightly in excess of that required to fill a mold cavity is severed from an extruded quantity and introduced into the cavity. The mold is closed to build up pressure and force the material throughout the cavity. The excess material causes a pressure build up above the necessary molding pressure and causes a plunger in an overflow well to retract under the excess pressure so as to cause the overflow well to receive the excess material. Pressure can be maintained on material in the well during cooling to maintain the cavity filled when shrinkage occurs. Where adjacent thick and thin wall portions are formed in the article, the thick wall forming portion of the cavity may contain another well which receives excess material at a pressure slightly lower than the overflow well and this excess material may then be forced back into the cavity under pressure to insure filling thereof.

1 Claim, 4 Drawing Figures

INVENTOR.
EMERY I. VALYI

BY

ATTORNEY

METHOD OF COMPRESSION MOLDING A THERMOPLASTIC ARTICLE WITH WALLS OF VARIABLE THICKNESS

This application is a division of copending application Ser. No. 834,233 filed June 12, 1969, now abandoned which was a Continuation of Application Ser. No. 618,862 filed Feb. 27, 1967, now abandoned.

This invention relates to a process for molding organic plastic materials and more particularly to a compression molding or transfer molding process.

In pressure molding and transfer molding processes, a predetermined quantity of plastic is preheated, either outside or within the mold, and having been suitably placed into the mold while the mold cavity is open, it is pressed into the desired shape. This can be carried out at relatively low pressures, because pressure is required only in order to conform the molten plastic to the contours of the mold, rather than to cause it to flow through narrow orifices, as in injection molding. Compression molding and transfer molding are usually applied only to thermosetting materials whereas injection molding is applied predominantly to thermoplastics.

The lower pressure processes have a great advantage in that both tool components and the machinery actuating the tool components may be of much lighter and therefore also faster acting construction.

The substantial advantages of low pressure molding are not taken advantage of in connection with thermoplastic materials because of the difficulties encountered in separating a volumetrically or gravimetrically accurate quantity of molten plastic from the source thereof, such as an extruder or other heating and blending device, and then in placing it into a mold cavity and causing it to flow therein. "Molten" thermoplastic materials are viscoelastic and their flow behavior is such as to render separation of accurate quantities difficult. Yet in order to accomplish a satisfactory compression molding job, it is essential to have an exact quantity weighed out, or measured out, so as to produce a complete filling of the mold cavity.

If this separation of molten plastic from a parent mass does not need to be carried out with ultimate accuracy, however, such separation is comparatively easily effected. One of the purposes of this invention is to provide a molding method in which a quantity of molten plastic is separated from a parent mass with less than ultimate accuracy and means are provided in the molding step to compensate for the possible differences between the quantities that are successively introduced into the mold. Another purpose of the invention is to provide a simple procedure of metering of molten thermoplastic into a mold cavity.

Various other objects and advantages will be apparent as the nature of the invention is more fully disclosed.

In one embodiment of the invention the compression mold is provided with a small overflow passage or well which is closed by a spring pressed or fluid actuated plunger. The plunger is biased to maintain a pressure slightly in excess of the molding pressure, that is, in excess of the pressure required to cause the plastic to conform to the mold cavity.

In the molding cycle an amount of plastic slightly in excess of that required to fill the mold cavity is introduced into the mold and the mold is closed in a manner to exert pressure on the plastic for distributing the same throughout the mold cavity as in the usual compression molding process. After the mold cavity has been filled the pressure within the plastic is caused to build up sufficiently to overcome the bias acting on the plunger in the overflow well and the plunger is depressed to provide space to accommodate the excess plastic while at the same time maintaining the required molding pressure on the plastic. The plunger also serves to maintain pressure on the plastic so as to maintain the mold cavity filled during cooling when shrinkage is likely to occur.

The nature of the invention will be better understood from the following description taken in connection with the accompanying drawing in which certain specific embodiments have been set forth for purposes of illustration.

Figure 1:
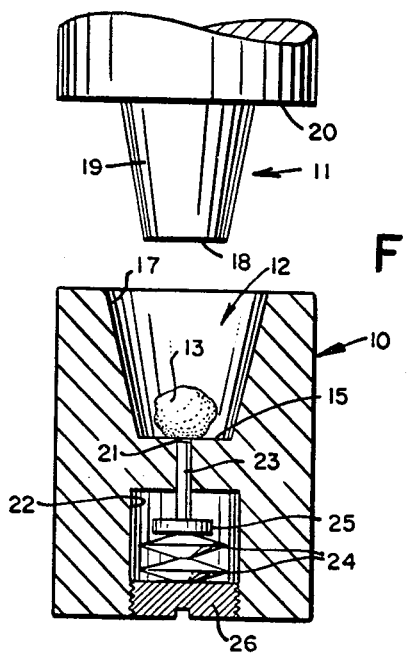
FIG. 1 is a diagrammatic view of a compression mold embodying the invention, showing the mold in open position with a charge of plastic therein.
Figure 2:
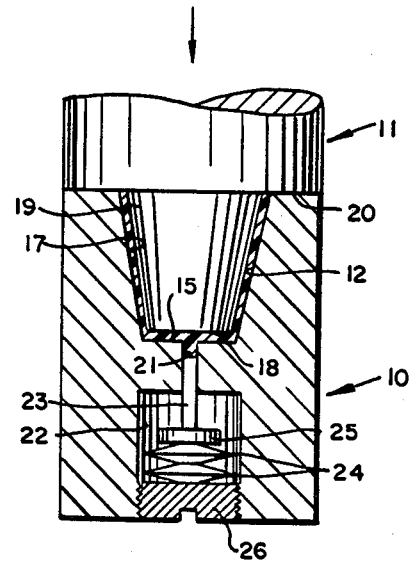
FIG. 2 is a similar diagrammatic view showing the mold in closed position.

Referring to FIGS. 1 and 2 more in detail, the invention is shown as embodied in a compression mold composed of an outer mold member 10 and an inner mold member 11 having cooperating surfaces which form a cavity 12 conforming to the object to be molded. The inner mold member 11 is insertable into the outer mold member 10 for the molding operation and is retractable therefrom for the insertion of the charge 13 of moldable plastic and for the removal of the molded object.

In the form shown the outer mold member 10 is provided with a mold cavity formed by a bottom wall 15 and side wall 17. The inner mold member 11 is formed with a bottom wall 18 and side wall 19 which, when the inner member is seated in the outer mold, are spaced from the walls 16 and 17 to form the cavity 12. The inner member 11 is also formed with a shoulder 20 which is adapted to close the cavity 12 when the members are closed.

The outer member 10 is provided with an overflow well 21 registering with a spring chamber 22 and communicating through the bottom wall 15 of the outer member with the mold cavity 12. A plunger 23 is disposed in the well 21 and is spring pressed inwardly by a series of spring disc 24 in the spring chamber 22 bearing against a head 25 on the plunger 23 and held by a threaded plug 26. The arrangement of the spring disc 24 is such that the inner end of the plunger 23 is normally about flush with the surface of the wall 15 but is retractable against the spring pressure in response to fluid pressure in excess of the normal molding pressure. The disc spring may, of course, be replaced by a coiled spring or by a fluid pressure chamber which exerts pressure against the plunger 23 for the above purpose.

In operation the inner member 11 is retracted to expose the mold cavity in the outer member 10 and a measured quantity of plastic 13 is placed in the cavity as shown in FIG. 1. This measured amount may be slightly in excess of the requirements for filling the mold cavity.

The inner mold member 11 is then inserted and advanced to close the cavity. As the mold is closed the plastic is displaced from its original shape and caused to fill the cavity. When the cavity is completely filled any excess of plastic which is present causes the pressure to build up to a point such that the plunger 23 is retracted to allow the excess to flow into the overflow well 21.

It will be noted that the plunger not only provides means to accommodate a limited excess of material but also provides means for maintaining a pressure on the plastic as it cools in the cavity. Thus any change in volume due to shrinkage is taken up and the thickness of the wall of the molded object is accurately conformed to the mold cavity. The necessity for accurately measuring the quantity of plastic to be introduced and the building up of excessive molding pressures are thus avoided.

Figure 3:
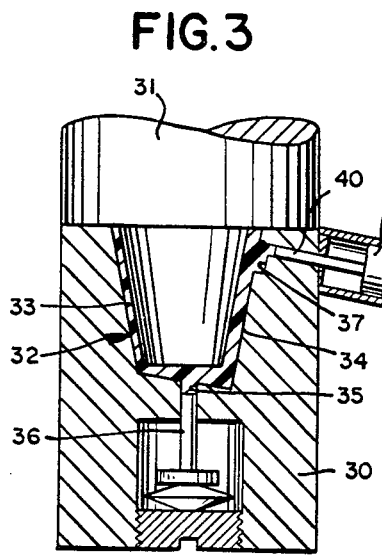
FIG. 3 is a view similar to FIG. 1 illustrating a modified type of mold.

In the embodiment of FIG. 3 the outer mold member 30 and the inner mold member 31 are generally similar to those of FIGS. 1 and 2 except that the members are shaped to form an object having walls of varying thickness. The object 32 is shown as having a relatively thick wall portion 34 and a relatively thin wall portion 33. The object is shown as cup-shaped for illustration only. It is to be understood that the object may have any irregular shape. The outer mold member 30 carries an overflow well 35 having a spring pressed plunger 36 as in the previously described form.

In a molded article having alternate thin and thick wall portions, as for example thin wall portion 33 adjoining a thick portion 34, it is desirable to provide means for forcing plastic material through the thin wall portion also maintaining pressure on the plastic in the thicker portions. For this purpose the outer mold member 30 is provided with a chamber 37 communicating with the thick wall portion 34 of the mold cavity. This chamber contains a plunger 40 actuated by a piston 41 sliding in a cylinder 42 to which fluid pressure is supplied through a duct 43.

In this embodiment the plunger 40 may be set to be retracted at a pressure somewhat below that of the plunger 36 so that the plastic flows through the wall area into the chamber 37 and builds up pressure therein before the overflow well 35 is opened.

After the plastic has partly cooled fluid pressure may be applied to the cylinder 42 for exerting increased pressure on the plastic in the chamber 37 so as to force the plastic back into the wall cavity and to maintain the plastic in such cavity under pressure until the plastic has cooled and solidified.

It is to be understood that the spring assembly 24 of FIGS. 1 and 2 may be replaced by a fluid actuated cylinder similar to the cylinder 42 of FIG. 3 or that the plunger 40 of FIG. 3 may be spring biased if desired.

Figure 4:
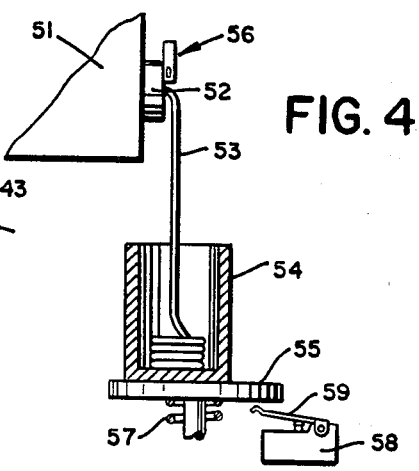
FIG. 4 is an elevation with parts in section showing apparatus for measuring and cutting a predetermined quantity of plastic from an extruder.

FIG. 4 illustrated a system for obtaining a measured quantity of plastic for introduction into the mold cavity. This system comprises an extruder 51 in which the plastic material is plasticized and is provided with a nozzle 52 through which a strip of plastic 53 having a small cross-section is extruded into a receptacle shown as a cup 54. The cup 54 may be eccentrically mounted on a turn table 55 so that as the table rotates the thin strip of plastic is laid in overlapping loops or folds in the cup.

When the desired quantity of plastic has been extruded into the cup, the strip is cut at a point adjacent the nozzle by suitable means such as by a hot wire cutter 56 or by a knife.

The cutter 56 may be actuated automatically in response to a given quantity of material in the cup 54 or by other suitable means. The turntable 55 may, for example, be spring loaded by a spring 57 for retraction in response to the weight of the plastic material in the receiver 54 and a micro-switch 58 may be positioned to be actuated by a feeler arm 59 in response to a predetermined depression of the turntable. The micro-switch in turn is connected to control the action of the cutter 56. The cup may be replaced by the outer mold member 10 and the plastic extruded directly into the mold cavity if the size and shape permit.

The use of a thin strip permits the plastic to be cut with greater ease and the severed quantity of plastic to be more accurately controlled. This system is particularly adapted for use with the mold structure shown above wherein the overflow passage allows a small variation in quantity of plastic to be tolerated provided the quantity is at least equal to the minimum quantity required to fill the mold cavity.

What is claimed is:

1. The method of making an article of thermoplastic material with walls of variable thickness including adjoining thick and thin wall portions which comprises providing a mold defining a cavity having corresponding adjoining thick and thin wall forming portions and further defining an overflow well and a chamber communicating with said cavity, said chamber communicating with said thick wall forming portions thereof, extruding thermoplastic material in flowable form, severing a quantity of the extruded plastic material such that the separated quantity of material is unequal to, and slightly in excess of the capacity of said mold cavity but less than the combined capacity of the mold cavity, overflow well, and chamber, introducing the severed quantity of the material into said mold cavity and subjecting the material in said cavity to an initial molding pressure suited to cause the material to fill said cavity, yieldably closing the entrances to said overflow well and chamber with pressures in excess of said initial mold pressure but less than the pressure exerted due to the excess of material over the capacity of said cavity, the yielding pressure of said chamber being somewhat less than that of said overflow well, whereby the excess material, after the cavity is filled, is first received beyond said cavity in said chamber and builds up pressure therein and is then received beyond said cavity in said overflow well, and, after the material has partly cooled, applying increased pressure on the material in said chamber so as to force the material back into said cavity and maintain the material in said cavity under pressure until the material has cooled and solidified.

* * * * *